(12) United States Patent
Dykstra

(10) Patent No.: US 6,553,123 B1
(45) Date of Patent: Apr. 22, 2003

(54) CONVERSATION MIRROR/INTERCOM

(75) Inventor: Steven P. Dykstra, Zeeland, MI (US)

(73) Assignee: Prince Corporation, Holland, MI (US)

(*) Notice: Subject to any disclaimer, the term of this patent is extended or adjusted under 35 U.S.C. 154(b) by 0 days.

(21) Appl. No.: 09/132,333

(22) Filed: Aug. 12, 1998

(51) Int. Cl.⁷ .................. H04B 1/00; H04R 9/08; H04R 1/02
(52) U.S. Cl. .................. 381/86; 381/365; 381/389
(58) Field of Search .................. 381/86, 389, 365; 340/425.5; 455/345, 90, 575

(56) References Cited

U.S. PATENT DOCUMENTS

| | | |
|---|---|---|
| 3,099,797 A | 7/1963 | Piccinini |
| 3,950,701 A | 4/1976 | Matuoka et al. ............. 325/312 |
| 4,056,696 A | 11/1977 | Meyerle et al. ............. 179/100 |
| 4,362,907 A | 12/1982 | Polacsek ........................ 179/1 |
| 4,445,228 A | 4/1984 | Bruni ............................ 381/24 |
| D294,495 S | 3/1988 | Nissley ........................ 381/86 |
| 4,768,870 A | 9/1988 | Chen ............................ 350/631 |
| 4,824,159 A * | 4/1989 | Fluharty et al. ............... 296/37 |
| 4,875,229 A | 10/1989 | Palett et al. .................. 379/58 |
| 4,905,270 A * | 2/1990 | Ono .............................. 379/58 |
| 4,930,742 A * | 6/1990 | Schofield et al. ...... 248/225.11 |
| 4,934,802 A * | 6/1990 | Fluharty et al. ............. 350/604 |
| 4,965,833 A | 10/1990 | McGregor et al. ............. 381/83 |
| 5,004,289 A | 4/1991 | Lanser et al. ............. 296/97.12 |
| 5,039,153 A | 8/1991 | Lindberg et al. ........... 296/37.7 |
| 5,185,803 A * | 2/1993 | Moyski et al. ................ 381/86 |
| 5,263,199 A | 11/1993 | Barnes et al. ............... 455/344 |
| 5,754,664 A | 5/1998 | Clark et al. .................. 381/86 |
| 6,124,886 A * | 9/2000 | DeLine et al. .............. 340/433 |

FOREIGN PATENT DOCUMENTS

| | | |
|---|---|---|
| IT | 671885 | 10/1964 |
| JP | 6058734 | 4/1985 |
| JP | 3231044 | 10/1991 |

* cited by examiner

Primary Examiner—Forester W. Isen
Assistant Examiner—Elizabeth McChesney
(74) Attorney, Agent, or Firm—Foley & Lardner

(57) ABSTRACT

A combined conversation mirror and intercom is mounted in a mirror frame pivotally mounted to a vehicle accessory, such as an overhead console. The frame is movable between an unobtrusive stored position and an extended use position located such that the vehicle operator can see mid or rear seat passengers, and, similarly, the mid or rear seat passengers can see the vehicle operator. In a preferred embodiment of the invention, an electrical switch is coupled between the mirror frame and vehicle accessory such that movement of the mirror frame actuates the switch for powering the intercom circuit.

14 Claims, 1 Drawing Sheet

CONVERSATION MIRROR/INTERCOM

BACKGROUND OF THE INVENTION

The present invention relates to a vehicle interior accessory comprising an interior mirror and particularly to an intercom system associated with such a mirror.

With the ever increasing popularity of mini vans and sport utility vehicles, which frequently have multiple rows of seats, the ability to effectively communicate between the front and rear seat passengers and, in the case of families, the vehicle operator and children in the rear seat area has become problematical. U.S. Pat. No. 4,934,802 discloses a small, centrally located, convexly curved conversation mirror which allows the vehicle operator to establish eye contact with rear seat areas without the need to move or use the rearview mirror employed for monitoring traffic conditions. When the radio is playing and the like, for example, however, although visual contact may be established, it still is difficult to communicate verbally, particularly with children who may not be attentive. Accordingly, there exists a need for a system by which visual and verbal communication between front seat occupants and mid or rear seat occupants can be effectively established.

SUMMARY OF THE PRESENT INVENTION

The system of the present invention solves this problem by providing a combined conversation mirror and intercom in which a conversation mirror is mounted in a mirror frame pivotally mounted to a vehicle accessory, such as an overhead console, and movable between an unobtrusive stored position and an extended use position located such that the vehicle operator can see mid or rear seat passengers, and, similarly, the mid or rear seat passengers can see the vehicle operator. Mounted preferably within the mirror frame is a microphone and/or speaker coupled to an amplifier powered by a power switch actuated by the operation of the mirror being moved from the stored to use positions. The amplifier is coupled to a speaker located in the vicinity of the rear seat area such that the vehicle operator's speech is amplified and clearly heard by the rear seat passengers. A two-way system can be provided by which the rear seat passengers can likewise be provided with a conveniently located microphone coupled to an amplifier and to a speaker associated with the mirror frame, such that two-way amplified verbal communications can also be established.

In a further preferred embodiment of the invention, the electrical switch is coupled between the mirror frame and vehicle accessory such that movement of the mirror frame actuates the switch for powering the amplifying circuits associated with the speaker and microphones and also can provide a logic output signal for muting an existing audio system, such that the two-way communications can be more effectively established. Thus, with the system of the present invention, both visual and verbal communications can be effectively established between a vehicle operator and a rear seat passenger.

These and other features, objects and advantages of the present invention will become apparent upon reading the following description thereof together with reference to the accompanying drawings.

DETAILED DESCRIPTION OF THE PREFERRED EMBODIMENT

Figure 1:
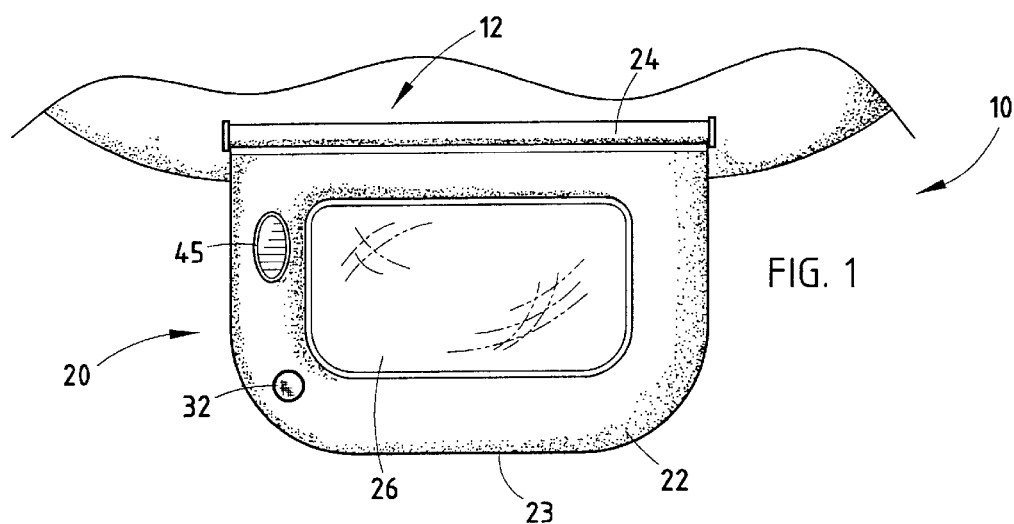
FIG. 1 is a fragmentary front elevational view of a vehicle including a conversation mirror/intercom embodying the present invention and shown in a use position.
Figure 2:
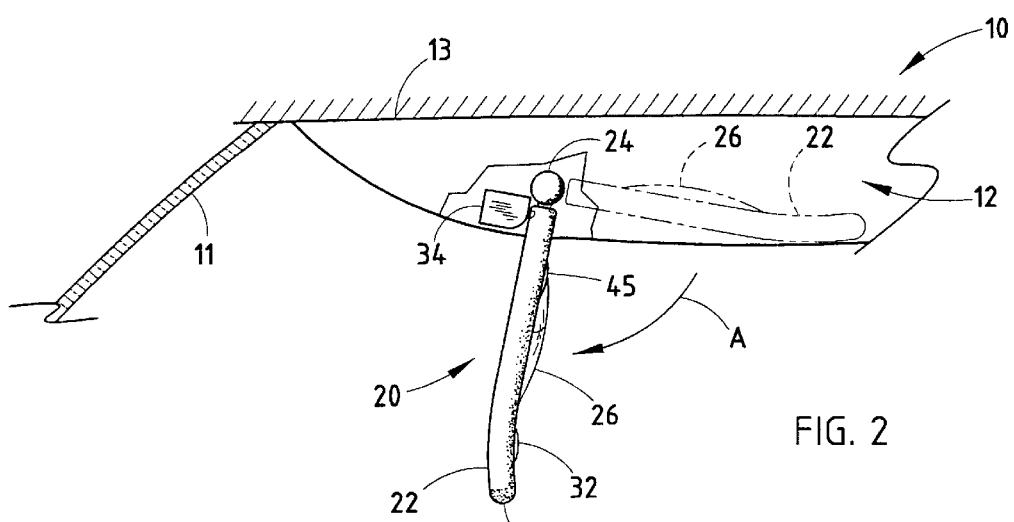
FIG. 2 is a partly broken-away left-side elevational view of the conversation mirror shown in FIG. 1, showing its stored position in phantom form.

Referring initially to FIG. 1, there is shown a vehicle 10, such as a mini van, sports utility vehicle or other passenger carrying vehicle which has a front seat area including an operator seat and a rear seating area spaced therefrom for carrying passengers. Typically, a van may include three rows of seats. The system of the present invention is particularly advantageous for communicating with second and third row seated passengers. In FIGS. 1 and 2, the vehicle 10 includes an overhead console 12 typically mounted to the sheet metal roof 13 (shown schematically in FIG. 2) of the vehicle behind windshield 11 and including a variety of accessories such as sunglass storage compartments, garage door opening transmitters, and overhead electronics such as an electronic compass or the like. Pivotally mounted to the console 12 is a conversation mirror/intercom system 20 of the present invention, which includes a mirror frame 22 pivotally mounted to the console by means of a pivot axle 24 extending between the console 12 and mirror frame 22 and provided with a torque fitting for holding the mirror frame and a convex conversation mirror 26 therein in a stored position, shown in phantom in FIG. 2, or in a selected lowered use position, such as illustrated in FIGS. 1 and 2. Although in the preferred embodiment the mirror frame 22 is pivotally mounted to the console 12, other movable mounting structure, such as a slide-out mount, could also be employed. Mirror 26 is conventionally mounted within the frame and can have a shape as described in the above-identified U.S. Pat. No. 4,934,802, the disclosure of which is incorporated herein by reference. Mirror 26 is preferably convex to provide a relatively unobtrusive and yet effective mirror for allowing the driver to visually establish eye contact with mid and/or rear seat passengers.

Figure 3:
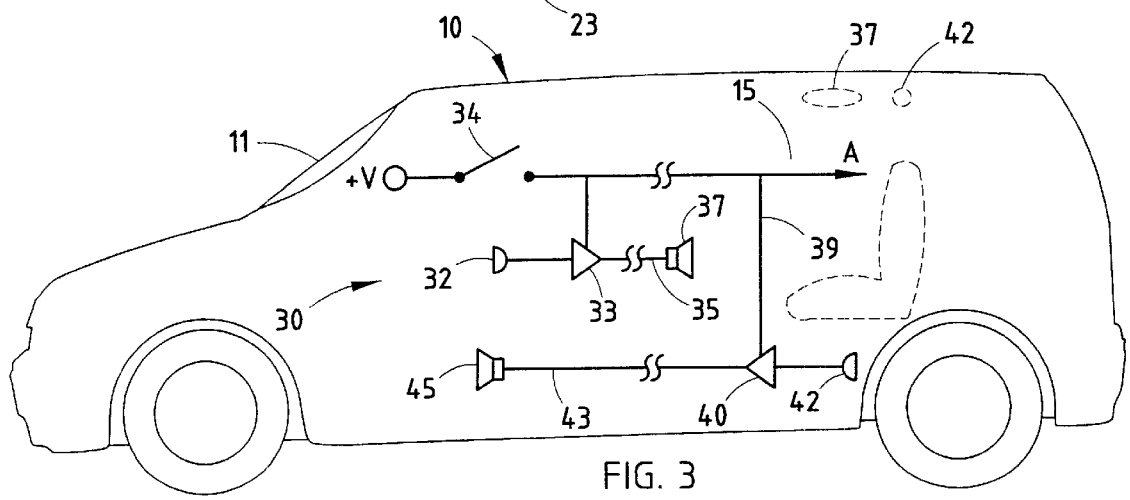
FIG. 3 is an electrical circuit diagram in schematic form of the intercom circuit for the mirror system of the present invention, showing pictorially the location of the transducers in a typical vehicle.

Mirror frame 22 can be made of a suitable polymeric material used in the automotive environment and has sufficient space therein to receive and house at least part of the electronic circuit 30 shown in FIG. 3, including a microphone 32 mounted in the mirror frame in a location where verbal communications from the vehicle operator can clearly be picked up by the microphone 32. Thus, in a preferred embodiment of the invention, the microphone is located in the lower left corner of the mirror frame 22 so that, when the vehicle operator speaks, the voice is picked up by the microphone for subsequent signal processing. The mirror frame may pivot between a stored position, shown in phantom in FIG. 2, within the vehicle console 12 to the lowered use position, as shown in solid lines in FIG. 2 and in FIG. 1, for use. The pivot axle and torque fitting can be of the type used, for example, in vanity mirror covers or pivoted mirrors such as those disclosed in U.S. Pat. Nos. 5,004,289; 5,039, 153; or 4,824,159. An electrical switch 34 is positioned between the mirror frame 22 and console 12 to be actuated by movement of the mirror frame 22 to a use position for applying electrical operating power to the electrical circuit 30, shown in detail in FIG. 3, for activating the intercom circuit for establishing voice communications. The intercom circuit is now described in greater detail in connection with FIG. 3.

In FIG. 3, the vehicle 10 includes an intercom circuit 30 in an overhead console located near the windshield 11, as seen in FIG. 2. The remaining transducers (37, 42), as described below are located in the mid and/or rear seat areas 15 of the vehicle, as shown pictorially in FIG. 3. Intercom circuit 30 includes the microphone 32 which is coupled to an audio amplifier 33 having an input coupled to microphone 32 and an output coupled to a speaker 37 positioned remotely by means of conductors 35 such that the speaker 37 can be positioned remotely and adjacent the rear seat passenger area of a vehicle, such as a van, sport utility vehicle or the like. Thus, speaker 37 may be located in the headliner of the vehicle utilizing a mounting system such as disclosed in U.S. Pat. No. 5,754,664. Amplifier 33 is powered by the vehicle power supply system identified as +V in FIG. 3 through switch 34 such that, when the mirror frame 22 is moved from a stored position to a use position, switch 34 is closed, providing operator power for the amplifier 33. The switch closure 34 may also provide a logic "1" output signal at an output terminal A in FIG. 3, which can be employed by a logic circuit for muting an existing radio or stereo system output, such that verbal communication can be more effectively established. Switch closure 34 also may provide operating power through a conductor 39 to an amplifier 40 associated with the rear seat passenger area and having a microphone 42 located in the rear seat area 15 for picking up voice communications from rear seat passengers which, in turn, is amplified by amplifier 40 and applied by conductors 43 to a speaker 45 which is mounted within the mirror 22, as shown in FIG. 1.

In some embodiments, circuit 30 may include two-way amplifiers and signal handling circuits which allow the microphone 32 and speaker 37 to operate as both a microphone and speaker such that only a single sound transducer need be used in the mirror frame 22 and in the rear seat area. Such conventional circuits and transducers are well known to those skilled in the art.

For use of the system, the operator pivots the mirror frame 22 downwardly from the stored position shown in FIG. 2 by gripping the lower edge 23 of the mirror frame and pivoting the frame about pivot axle 24 adjusting the mirror 26 to a position suitable for viewing the rear seat passengers. In this position, switch 34 is closed, providing power for amplifiers 33 and 40 such that two-way electrically amplified verbal communications between the vehicle operator and rear seat passengers can be established. Simultaneously, the signal from output terminal A can be employed to mute existing audio output from a stereo system, such that verbal communications are not hampered by extraneous audible information. When the communications have been completed, the mirror frame 22 is pivoted in a direction opposite arrow A in FIG. 2 back to the storage position, opening switch 34 and deactuating the amplifiers and returning the stereo system to a normal operating mode such that the front and rear seat passengers can again (perhaps desirably) remain incommunicado.

It will become apparent to those skilled in the art that various modifications to the preferred embodiment of the invention as described herein can be made without departing from the spirit or scope of the invention as defined by the appended claims.

The invention claimed is:

1. A conversation mirror/intercom for a vehicle comprising:

a vehicle accessory for mounting to the roof area of a vehicle near a vehicle operator;

a mirror frame mounted to said vehicle accessory for movement between stored and use positions;

a conversation mirror positioned in said mirror frame;

an electrical circuit including a first transducer and an amplifier, said transducer positioned in said mirror frame; and a second transducer for positioning in spaced relationship to said first transducer, wherein said electrical circuit is actuated upon movement of the mirror frame from a stored to a use position, allowing verbal communication between the vehicle occupants.

2. The mirror/intercom as defined in claim 1 and further including an electrical switch cooperating with said mirror frame and vehicle accessory for applying electrical operating power to said electrical circuit when said mirror frame is moved from a stored to a use position.

3. The mirror/intercom as defined in claim 2 wherein said accessory is an overhead console.

4. The mirror/intercom as defined in claim 3 wherein said first transducer is mounted in said mirror frame.

5. The mirror/intercom as defined in claim 4 wherein said electrical circuit includes an audio amplifier having an input coupled to said first transducer and an output coupled to said second transducer.

6. The mirror/intercom as defined in claim 5 wherein said first transducer mounted in said mirror frame is a microphone.

7. The mirror/intercom as defined in claim 6 wherein said second transducer is a speaker.

8. The mirror/intercom as defined in claim 1 wherein said mirror is convex.

9. A conversation mirror/intercom for a vehicle comprising:

a vehicle accessory for mounting to the roof area of a vehicle near a vehicle operator;

a mirror frame pivotally mounted to said vehicle accessory for movement between stored and use positions;

a conversation mirror positioned in said mirror frame;

an electrical circuit including a microphone and an amplifier, said microphone positioned in said mirror frame; and a speaker for positioning in a rear seat area of a vehicle, wherein said electrical circuit is actuated upon movement of the mirror frame from a stored to a use position for activating the microphone and the speaker allowing verbal communication between vehicle occupants.

10. The mirror/intercom as defined in claim 9 wherein said mirror is convex.

11. The mirror/intercom as defined in claim 10 wherein said accessory is an overhead console.

12. The mirror/intercom as defined in claim 11 wherein said microphone is mounted in said mirror frame.

13. The mirror/intercom as defined in claim 12 and further including an electrical switch cooperating with said mirror frame and vehicle accessory for applying electrical operating power to said electrical circuit when said mirror frame is moved from a stored to a use position.

14. The mirror/intercom as defined in claim 13 wherein said electrical circuit includes an audio amplifier having an input coupled to said microphone and an output coupled to said speaker.

* * * * *